United States Patent
Fäcke et al.

(10) Patent No.: US 7,514,478 B2
(45) Date of Patent: Apr. 7, 2009

(54) SOLID, RADIATION-CURING BINDERS WITH REACTIVE THINNERS

(75) Inventors: Thomas Fäcke, Bridgeville, PA (US); Jan Weikard, Odenthal (DE); Peter Thometzek, Stuttgart (DE)

(73) Assignee: Bayer MaterialScience AG, Leverkusen (DE)

( * ) Notice: Subject to any disclaimer, the term of this patent is extended or adjusted under 35 U.S.C. 154(b) by 406 days.

(21) Appl. No.: 10/994,835

(22) Filed: Nov. 22, 2004

(65) Prior Publication Data

US 2005/0170185 A1 Aug. 4, 2005

(30) Foreign Application Priority Data

Dec. 1, 2003 (DE) ................................. 103 56 041

(51) Int. Cl.
| | |
|---|---|
| C08F 2/46 | (2006.01) |
| C08F 2/50 | (2006.01) |
| C08J 3/28 | (2006.01) |
| C08G 63/91 | (2006.01) |

(52) U.S. Cl. ........................... 522/96; 522/90; 522/104; 522/107; 522/108; 522/109; 522/110; 522/111; 522/112; 522/113; 522/114; 522/120; 522/121; 522/134; 522/135; 522/142; 522/150; 522/151; 522/152; 522/153; 522/162; 522/163; 522/164; 525/50; 525/55; 525/418; 525/420; 525/425; 525/426; 525/461; 525/466; 525/468; 525/403; 525/404; 525/509; 525/514; 525/519; 525/518; 525/934

(58) Field of Classification Search .................... 522/90, 522/96, 104, 107, 109, 108, 110, 111, 112, 522/113, 114, 120, 121, 134, 135, 142, 150, 522/151, 152, 153, 162, 163, 164; 525/934, 525/50, 55, 418, 420, 425, 426, 461, 466, 525/468, 403, 404, 509, 514, 518, 519

See application file for complete search history.

(56) References Cited

U.S. PATENT DOCUMENTS

| | | | | |
|---|---|---|---|---|
| 3,974,303 | A | 8/1976 | Iwase et al. | 427/27 |
| 5,068,305 | A | 11/1991 | Meixner et al. | 528/49 |
| 5,558,911 | A | 9/1996 | Blum | 427/517 |
| 5,620,751 | A | 4/1997 | Brindoepke et al. | 427/506 |
| 6,555,597 | B1 | 4/2003 | Weikard et al. | 522/174 |
| 6,780,897 | B1 * | 8/2004 | Blum et al. | 522/110 |
| 6,794,422 | B1 * | 9/2004 | Bruchmann et al. | 522/90 |
| 6,809,126 | B2 | 10/2004 | Fäcke et al. | 522/90 |
| 6,825,241 | B1 * | 11/2004 | Blum et al. | 522/96 |

FOREIGN PATENT DOCUMENTS

| | | |
|---|---|---|
| EP | 1 245 647 A1 | 10/2002 |
| WO | 03/044111 | 5/2003 |

OTHER PUBLICATIONS

Speckhard et al. Properties of UV Curable Polyurethane Acrylates: Effect of Reactive Diluent. [retrieved online, Feb. 25, 2008]. Retrieved from Internet <:URL: http://stinet.dtic.mil/oai?verb=getRecord&metadataPrefix=html&identifier=ADA143241>.*

An Introduction to Polymer Science, E.-G. Elias, (month unavailable) 1997, p. 315-136, "Glass Temperatures".

Chemistry & Technology of UV & EB Formulations for Coatings, Ink & Paints, vol. 2, P.K. T. Oldring (ed.), (month unavailable) 1991, pp. 73-97, N.S. Allen et al, "Urethane Acrylates".

Chemistry & Technology of UV & EB Formulations for Coatings, Ink & Paints, vol. 2, P.K.T. Oldring (ed.), (month unavailable) 1991, pp. 250-290, N.S. Allen et al, "Structures and Properties of Reactive Monomers".

* cited by examiner

*Primary Examiner*—Sanza L McClendon
(74) *Attorney, Agent, or Firm*—Noland J. Cheung; Robert S. Klemz

(57) ABSTRACT

Powder coating binders having a glass temperature of ≧35° C. containing at least one polymer and one or more radiation-curing reactive thinners, a process for the production of these powder coating binders and their use as a component of powder coatings.

15 Claims, No Drawings

SOLID, RADIATION-CURING BINDERS WITH REACTIVE THINNERS

CROSS REFERENCE TO RELATED PATENT APPLICATION

The present patent application claims the right of priority under 35 U.S.C. § 119 (a)-(d) of German Patent Application No. 103 56 041.6, filed Dec. 1, 2003.

BACKGROUND OF THE INVENTION

1. Field of the Invention

The present invention relates to novel powder coating binders with a glass temperature of $\geq 35°$ C. containing at least one organic polymer and one or more radiation-curing reactive thinners, a process for the production of these powder coating binders and their use as a component of powder coatings.

2. Description of the Prior Art

Powder coating binders are applied on to a substrate, melted with heat and cured by radiation-curing, electromagnetic radiation. Curing by means of electromagnetic radiation has gained increasing importance in recent years. The curing process is very rapid, which reduces the process speed of the coating operation and thus represents a cost saving. Radiation-curing powder coatings have already been known for a very long time (U.S. Pat. No. 3,974,303) and are usually based on polyesters (e.g. DE-A 42 28 514), polyurethanes (EP-A 410 242) and polyacrylates (DE-A 44 13 436). Mixtures are also known.

The use of oligo- and polyurethanes as powdered binders makes it possible to obtain particularly high-quality coatings. While EP-A 410 242 describes the production of these binders in organic solvents, DE-A 19 939 843 teaches the solvent-free production using a high proportion by weight of 10 to 95% of a crystalline component made up of a mono- or diisocyanate and a monohydroxyalkyl (meth)acrylate. This synthesis without solvents is only made possible by the viscosity-lowering effect of the molten, crystalline component.

A disadvantage of the oligo- and polyurethanes described in EP-A 410 242 and DE-A 19 939 843 is their poor grindability. The products can only be ground without forming lumps at temperatures below 0° C. and all the other powder handling must take place at temperatures below room temperature.

In the case of amorphous materials, their properties are determined by whether the material is investigated above or below its glass transition temperature. Below its glass transition temperature, grindable products are generally obtained. If the glass transition temperature is too high, the products can be stirred only at very high temperatures. The properties of a powder coating are determined to a decisive extent by the ambient temperatures occurring during powder coating. In summer, and particularly in the vicinity of the ovens needed to melt the powder coatings, higher temperatures than conventional room temperatures of 20 to 25° C. can be expected. In practice, therefore, a sufficiently high glass transition temperature of $\geq 35°$ C. is necessary for powder coating.

In the PCT application WO 03/044111, UV powder coating binders are described which are amorphous and of particularly low viscosity in the molten state. For some applications, the high molecular weight of the urethane acrylate is disadvantageous here. Thus, hardly any degrees of freedom remain to adjust the double bond density.

In UV liquid paint chemistry it is conventional to use so-called reactive thinners, on the one hand to lower the viscosity of the liquid paint and at the same time to improve the UV reactivity by increasing the double bond density, which is generally also associated with improved paint resistance values.

The object on which the invention is based therefore consisted in providing radiation-curing powders that can be ground at room temperature, have a long shelf life and have no tendency towards caking under production conditions and practice-related processing conditions, which can be produced without solvents and, in contrast to the prior art, contain reactive thinners conventionally used to adjust the double bond density in liquid paint chemistry.

SUMMARY OF THE INVENTION

The present invention is directed to powder coating binders having a glass transition temperature of at least 35° C., containing at least one organic polymer selected from the group consisting of polyurethanes, polyesters, polyacrylates, polyethers, polyamides, polycarbonates and mixtures of the above polymers, together with at least 2 percent by weight of one or more radiation-curing reactive thinners.

The present invention also provides a process for production of the above-described powder coating binders, which includes mixing
 a) one or more organic polymers selected from polyurethanes, polyesters, polyacrylates, polyethers, polyamides, polycarbonates and mixtures thereof; with
 b) at least 2 wt. % of one or more radiation-curing reactive thinners, where the composition of components a) and b), and their quantitative ratio to one another, is selected such that the glass temperature of the resulting powder coating binder is at least 35° C.

The present invention additionally provides powder coatings containing
 i) at least one powder coating binder according to claim 1,
 ii) optionally other unsaturated binders different from i) with groups capable of reacting with ethylenically unsaturated compounds by polymerisation under the action of actinic radiation (radiation-curing groups),
 iii) optionally auxiliary substances and additives conventional in paint chemistry selected from the group consisting of pigments, flow control agents, deaerating agents, tribologically active additives and/or thixotropic agents, and
 iv) at least one thermally or photochemically activated radical former.

The present invention further provides a method of coating a substrate that includes applying the powder coating binders and powder coatings described above to at least a portion of a substrate, to the coatings obtained from the above-described powder coating binders and powder coatings, and to the substrates coated with such coatings.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about."

The present invention provides radiation-curing powders that can be ground at room temperature, have a long shelf life and have no tendency towards caking under production conditions and practice-related processing conditions. The powders can be produced without solvents and contain reactive thinners conventionally used to adjust the double bond density in liquid paint chemistry.

Thus, in the present invention it has been found that powders that can be readily ground at room temperature and have a long shelf life, which can also be produced in the melt without solvents, are obtained if suitable, optionally unsaturated, organic polymers are used, so that, despite the additional incorporation of one or more reactive thinners, sufficiently high glass transition temperatures of the mixtures result.

This is surprising as, when reactive thinners are added, a marked reduction in the glass transition temperature, or even lump formation, can normally be expected.

The present invention provides powder coating binders with a glass temperature of at least 35° C., containing at least one organic polymer selected from the group consisting of polyurethanes, polyesters, polyacrylates, polyethers, polyamides, polycarbonates and mixtures of the above polymers, together with at least 2 percent by weight of one or more radiation-curing reactive thinners.

The invention also provides a process for the production of the powder coating binders according to the invention, in which
a) one or more organic polymers selected from the group consisting of polyurethanes, polyesters, polyacrylates, polyethers, polyamides, polycarbonates and mixtures of the above polymers are mixed, during or following their production,
b) with at least 2 wt. % of one or more radiation-curing reactive thinners, wherein the composition of components a) and b), and their quantitative ratio to one another, is to be selected such that a glass temperature of the binder according to the invention of at least 35° C. results.

The invention also provides the incorporation of the powder coating binders into powder coatings and their use for the coating of substrates of wood, metal, plastic, mineral substances and/or substrates of the above that have already been coated or of substrates of the above consisting of any combinations of said materials. Particular mention should be made here of applications in the industrial coating of MDF panels, pre-assembled, superior goods (for example those containing e.g. structural components that are already temperature-sensitive), the coating of furniture, coils, articles from daily life, cars, car bodies and their accessory parts. The powder coating binders with reactive thinners according to the invention can also be used in combination with one another here, or with other binders conventionally used in powder coating chemistry; for example with polyesters, polyacrylates, polyurethanes, polyethers, polyamides and polycarbonates, which can also optionally contain unsaturated groups.

As is conventional in the polymer sciences, a glass transition temperature or glass temperature ($T_g$) describes the temperature at which an amorphous material changes on heating from a glassy to a liquid (in the case of low molecular weight substances) or to a rubber-like (in the case of high molecular weight substances) state. Semi-crystalline materials also possess a glass transition temperature. Detailed information on this subject can be found in H.-G. Elias, An Introduction to Polymer Science, VCH Verlagsgesellschaft mbH, Weinheim, Germany 1997, pp. 315-316.

Actinic radiation is understood to mean electromagnetic, ionising radiation, particularly electron beams, UV rays and visible light (Roche Lexikon Medizin, $4^{th}$ edition; Urban & Fischer Verlag, Munich 1999).

Groups reacting with ethylenically unsaturated compounds by polymerisation under the action of actinic radiation (radiation-curing groups) can be for example vinyl, vinyl ether, propenyl, allyl, maleinyl, fumaryl, maleimide, dicyclopentadienyl, acrylamide, acrylic and methacrylic groups, with vinyl ether, acrylic and/or methacrylic groups being preferred and acrylic groups being particularly preferred.

A reactive thinner within the meaning of this invention refers to all organic substances containing, on average, at least one radiation-curing group, i.e. at least one group reacting with ethylenically unsaturated compounds by polymerisation under the action of actinic radiation.

The reactive thinners known to the person skilled in the art in the chemistry of radiation-curing binders (cf. "Chemistry & Technology of UV & EB Formulations for Coatings, Inks & Paints", vol. 2, P K T Oldring (ed.), SITA Technology, London, England, pp. 250-290, 1991) generally possess no other functional groups apart from the radiation-curing functionalities. However, it is quite possible also to use those compounds that additionally contain alcohol, acid, isocyanate, epoxy, silyl, phosphine, phosphate, isocyanate, urea, isocyanurate, uretdione, biuret or other groups, particularly if other advantageous effects, such as e.g. adhesion, are achieved thereby.

Examples of reactive thinners are (meth)acrylic acid and the esters thereof, vinyl (meth)acrylate, allyl(meth)acrylate, trimethylolpropane diallyl ether, glycerol tri(meth)acrylate, trimethylolpropane di(meth)acrylate, trimethylolpropane tri(meth)acrylate, pentaerythritol tri(meth)acrylate, pentaerythritol tetra(meth)acrylate, dipentaerythritol penta(meth)acrylate and dipentaerythritol hexa(meth)acrylate, neopentyl di(meth)acrylate, styrene, divinylbenzene, vinyltoluene, isobornyl(meth)acrylate, butoxyethyl(meth)acrylate, alkylene glycol di(meth)acrylates such as ethylene and propylene glycol di(meth)acrylates, polyalkylene glycol di(meth)acrylates, such as polyethylene and polypropylene glycol di(meth)acrylates, di(meth)acrylates of simple diols, such as e.g. butanediol di(meth)acrylate, hexanediol di(meth)acrylate, cyclohexanedimethanol di(meth)acrylate, dicyclopentyl (meth)acrylate. Hexanediol diacrylate, isobornyl methacrylate, isodecyl methacrylate, tricyclodecanedimethylol dimethacrylate, tripropylene glycol diacrylate, and the (meth)acrylated products of optionally ethoxylated or propoxylated diols or polyols, such as e.g. trimethylolpropane, pentaerythritol, bisphenol A or cyclohexanedimethanol, are preferred.

Mixtures of the aforementioned compounds can also be used. Trimethylolpropane trimethacrylate and/or trimethylolpropane triacrylate are preferred.

If reactive thinners are used in the production of binders based on isocyanates (e.g. from urethanes), reactive thinners having no groups that are reactive with isocyanates, or only those that react only very slowly with isocyanates (such as e.g. sterically hindered alcohols), are preferred.

The maximum content of a reactive thinner is determined by the extent to which this lowers the glass transition temperature of the binder. The glass transition temperature of the powder coating binders according to the invention is typically $\geq 35°$ C., preferably $\geq 42°$ C. and particularly preferably $\geq 48°$ C.

The powder coating binders containing less than 50 wt. %, and particularly preferably less than 30 wt. %, radiation-curing reactive thinners are therefore preferred.

The organic polymers to be used according to the invention preferably have a number average molecular weight of 1,000 to 10,000 g/mol, particularly preferably 1,200 to 5,000 g/mol.

The organic polymers of the aforementioned type to be used according to the invention can contain unsaturated groups reacting with ethylenically unsaturated compounds by polymerisation under the action of actinic radiation (radiation-curing groups) or they can be free from these radiation-curing groups. Preferably, at least one of the organic polymers to be used according to the invention contains one or more radiation-curing groups per molecule.

The production of the powder coating binders according to the invention with a $T_g$ of at least 35° C., containing at least 2 wt. % of one or more radiation-curing reactive thinners, can take place in that one or more organic polymers to be used according to the invention are first prepared, optionally as a mixture, and then the reactive thinner is added and incorporated. It is also possible to add the reactive thinner during, or even at the beginning of, the production of the organic polymers or the mixture thereof, which has the advantage that the melt viscosity of the mixture can be reduced.

The polyesters and polyamides to be used according to the invention are generally those that have been built up via either an unsaturated acid or an anhydride. Typical starting substances for this are maleic acid (anhydride) and fumaric acid.

To build up the organic polymers to be used according to the invention based on polyester, polycarbonate or polyurethane, as well as saturated alcohols, unsaturated ones can also be used, such as hydroxyalkyl(meth)acrylates with 2 to 12 carbon atoms in the alkyl chain, preferably 2 to 4 carbon atoms in the hydroxyalkyl residue, such as hydroxyethyl (meth)acrylate, 2- and 3-hydroxypropyl(meth)acrylate and 2-, 3- and 4-hydroxybutyl(meth)acrylate, and also OH-functional vinyl ethers, such as e.g. hydroxybutyl vinyl ethers and mixtures thereof. OH-functional (meth)acrylic acid esters or amides of n-hydric alcohols or amines or amino alcohols are also according to the invention, and mixtures thereof can also be used. These compounds or product mixtures include e.g. the esters of glycerol, trimethylolpropane and/or pentaerythritol. Defined monoalcohols from the reaction of epoxyfunctional (meth)acrylates with (meth)acrylic acid can also be used. For example, the reaction of glycidyl methacrylate with acrylic acid gives a mixed acrylic acid-methacrylic acid ester of glycerol, which can also be used advantageously.

Hydroxyethyl acrylate and the isomeric hydroxypropyl acrylates are preferred. Owing to the high production temperatures of polyesters and polyamides, this procedure with acrylic-functional alcohols is preferred only for the construction of polyurethanes.

Polyacrylates can only be modified by radiation curing after the polymerisation of the acrylate and vinyl aromatic monomers. This is achieved by means of functional groups, which are inert under the production conditions of the polyacrylate. Possible groups that can be modified on the polyacrylate are:

| Functional group on the polyacrylate | Modifying reagents |
| --- | --- |
| Epoxy | Acrylic acid, dimeric acrylic acid |
| Acid | Glycidyl compounds, e.g. glycidyl methacrylate |
| Alcohol | Acrylic acid, dimeric acrylic acid |
| Alcohol | Acrylic-functional isocyanate |
| Acrylic acid, dimeric acrylic acid | Alcohol |
| Acrylic-functional isocyanate | Alcohol |
| Anhydrides | Alcohol |
| Alcohol | Anhydrides |

Polyesters with a glass transition temperature of >40° C. can also be used. As is known to the person skilled in the art, these are produced in a condensation reaction from alcohols and acids. In the production of unsaturated polyesters, unsaturated diacids or anhydrides, such as e.g. fumaric acid and maleic acid, are additionally used. Further information on this subject is provided by the European Patent Application EP 585 742 A1 p. 1, line 30 to p. 3, line 18.

Thus, for example, reactive thinners can be added to an unsaturated polyester with a high glass transition temperature of 57° C., such as e.g. Uvecoat® 2100 (commercial product from UCB Chemicals, Belgium) without failing to reach a minimum glass transition temperature that is critical for the shelf life.

Examples of unsaturated organic polymers based on polyurethane to be used according to the invention can be obtained, according to PCT application WO 03/044111, by the reaction of A) one or more di- or polyisocyanates or mixtures thereof, with the optional addition of monoisocyanates, with B) one or more compounds reacting polyfunctionally with isocyanates and C) one or more compounds reacting monofunctionally with isocyanates, wherein the ratio of the amount of substance A) (mol NCO groups) to the sum of the amounts of substance of building blocks reacting with isocyanates B) and C) is between 0.8 and 1.2 and the (meth)acryloyl groups are contained in either B) or C) or in both components, characterised in that the ratio of the equivalents of the groups reacting with isocyanates on monofunctional compounds C) to the equivalents of the groups reacting with isocyanates on polyfunctionally reacting compounds B) is less than 1.2 and the compounds B) reacting polyfunctionally with isocyanates have a mean functionality of less than 2.5 and the proportion by weight of soft groups in the di- or polyfunctional isocyanates and in the di- or polyfunctional components reacting with isocyanates is less than 25 wt. %.

According to the invention, the term equivalents (Eq.) refers, as is conventional in chemical language usage, to the relative number of reacting groups present in the reaction. According to the invention, these are the groups reacting with isocyanates, such as alcohols or amines. In the case of the alcohols, for example, when using 1 mol monoalcohol=1 equivalent and 1 mol diol (i.e. 2 mol OH groups)=2 equivalents, this gives a ratio according to the invention of 1 Eq.:2 Eq.=0.5.

The term "mean functionality of compounds reacting polyfunctionally with isocyanates" needed for the description according to the invention describes the arithmetic mean via the mole fractions of the compounds reacting polyfunctionally with isocyanates weighted with their functionality. If, for example, 1 mol trimethylolpropane (functionality 3) and 2 mol ethylene glycol (functionality 2) are used, this gives a mean functionality of 1 mol/(1 mol+2 mol)·3+2 mol/(1 mol+2 mol)·2=2.33.

The term "proportion by weight of soft groups" needed for the description according to the invention refers to the chemical substructures in the at least bifunctional structural components. These chemical substructures include 1.) acyclic methylene groups (—$CH_2$—), 2.) —CHR—, —$CR_2$— groups, which have exclusively oxygen atoms and/or methylene groups adjacent to them, and R represents a group with no more than 16 carbon atoms which is not involved in the urethanisation/urea formation reaction, 3.) ether oxygen atoms, 4.) thioether sulfur atoms, 5.) di- and/or polysulfide sulfur groups,
6.) —O—Si(Me)$_2$—O— groups and
7.) olefin groups (—CH=CH—).

The proportion by weight of soft groups in an individual, at least bifunctional structural component is calculated e.g. for hexanediol as the proportion by weight of the 6 methylene groups to the total weight of the molecule (here: 6·14/118=71%), for isophorone diisocyanate (1 acyclic methylene group=14/222=6.3%), for diethylene glycol (4 methylene groups, 1 ether oxygen: (4·14+1·16)/106=67.9%), for propylene glycol (1 methylene group, one CHR group substituted with a methyl group: (14+(15+13))/76=55.2%), for toluidine diisocyanate (no soft group, i.e. 0%) etc. The proportion by weight of soft groups according to the invention in the urethane acrylate is now calculated from the sum of the proportions by weight of the at least bifunctional structural components, weighted in each case with their soft proportion contents as described above.

The isocyanates A) can be aliphatic or aromatic: cyclohexyl isocyanate, butyl isocyanate, phenyl isocyanate, tolyl isocyanate, 1,4-tetramethylene diisocyanate, 1,6-hexamethylene diisocyanate (HDI), 1,8-octamethylene diisocyanate, 1,11-undecamethylene diisocyanate, 1,12-dodecamethylene diisocyanate, 2,2,4- and 2,4,4-trimethyl-1,6-hexamethylene diisocyanate (TMDI), 1,3- and 1,4-cyclohexane diisocyanate, 1-isocyanato-3-isocyanatomethyl-3,5,5-trimethylcyclohexane (IPDI), 1-isocyanato-1-methyl-4(3)-isocyanatomethylcyclohexane (IMCI), 1,4-phenylene diisocyanate, 1,5-naphthylene diisocyanate, 1-isocyanato-2-isocyanatomethyl-cyclopentane, (4,4'- and/or 2,4'-)diisocyanatodicyclohexylmethane (H12-MDI, W) bis(4-isocyanato-3-methylcyclohexyl)methane, xylylene diisocyanate (XDI), tetramethyl-1,3- and/or -1,4-xylylene diisocyanate (TMXDI), 1,3- and/or 1,4-hexahydroxylylene diisocyanate (H6-XDI), 2,4- and/or 2,6-hexahydrotoluene diisocyanate (H6-TDI), 2,4- and/or 2,6-toluene diisocyanate (TDI), 4,4'- and/or 2,4'-diphenylmethane diisocyanate (MDI) or their derivatives with urethane, isocyanurate, allophanate, biuret, uretdione, iminooxadiazinedione structural units, provided that they possess at least one free NCO group, and mixtures thereof. IPDI, TDI, H12-MDI, H6-XDI and mixtures thereof are preferred. TDI, IPDI and H12-MDI are particularly preferred.

Component B) can be polyols such as ethylene glycol, 1,2- and 1,3-propanediol, the isomeric butanediols, neopentyl glycol, 1,6-hexanediol, 2-methyl-1,3-propanediol, 2,2,4-trimethyl-1,3-pentanediol, 2-n-butyl-2-ethyl-1,3-propanediol, glycerol monoalkanoates (such as e.g. the glycerol monostearates), dimer fatty alcohols, diethylene glycol, triethylene glycol, tetraethylene glycol, 1,4-dimethylolcyclohexane, dodecanediol, bisphenol A, hydrogenated bisphenol A, 1,3-hexanediol, 1,3-octanediol, 1,3-decanediol, 3-methyl-1,5-pentanediol, 3,3-dimethyl-1,2-butanediol, 2-methyl-1,3-pentanediol, 2-methyl-2,4-pentanediol, 3-hydroxymethyl-4-heptanol, 2-hydroxymethyl-2,3-dimethyl-1-pentanol, glycerol, trimethylolethane, trimethylolpropane, trimer fatty alcohols, isomeric hexanetriols, sorbitol, pentaerythritol, ditrimethylolpropane, dipentaerythritol, diglycerol and tricyclodecane alcohol (TCD).

OH-functional esters with a number average molecular weight Mn<2000, preferably Mn<500, obtained by reaction of the aforementioned polyols with ε-caprolactone, can also be used according to the invention. Unsaturated esters which, in addition to the above alcohols, consist of unsaturated acids or alcohols can also be used, such as: maleic acid (anhydride), fumaric acid, itaconic acid, citraconic acid (anhydride), aconitic acid, tetrahydrophthalic acid (anhydride), 3,6-endo-methylene-1,2,3,6-tetrahydrophthalic acid (anhydride).

Alcohols and amines containing (meth)acryloyl groups or reaction products substantially consisting of these, which are obtained by condensation of n-hydric alcohols or amines or amino alcohols with (meth)acrylic acid, are also suitable, with mixtures also possibly being used as the alcohols, amines or amino alcohols. These compounds or product mixtures include e.g. the reaction products of glycerol, trimethylolpropane and/or pentaerythritol, of low molecular-weight alkoxylation products of such alcohols, such as e.g. ethoxylated or propoxylated trimethylolpropane, with (meth)acrylic acid.

According to the invention, groups reacting with isocyanates, which are additionally incorporated into the urethane acrylates, are also used, such as e.g. dimethylolpropionic acid (DMPA), N-methyldiethanolamine, N-ethyldiethanolamine, N-(tert.)-butyldiethanolamine, N-isopropyldiethanolamine, N-n-propyl-diethanolamine, N-hexyldiethanolamine, N-phenyldiethanolamine, N-benzyl-diethanolamine, N-tolyldiethanolamine, N-lauryldiethanolamine, N-stearyldiethanolamine, triethanolamine, tris(2-aminoethyl)amine, N,N-bis(2-hydroxyethyl)ethylenediamine, 2-(2-dimethylaminoethylamino)ethanol, 2-(2-diethyl-aminoethylamino) ethanol, bis-2-(methylaminoethyl)methylamine and 1,4,7-triethyl-diethylenetriamine. Mixtures of different urethane acrylates are also optionally prepared, which contain on the one hand DMPA and on the other hand a tertiary amine described above.

Instead of or in combination with a polyol, the following amines can also be used to produce urea acrylates: ethanolamine, N-methylethanolamine, N-ethylethanolamine, 2-amino-1-propanol, tetramethylxylylenediamine, ethylenediamine, 1,6-hexamethylenediamine, isophorone diamine (IPDA), (4,4'- and/or 2,4'-)diamino-dicyclohexylmethane, (4,4'- and/or 2,4'-)diamino-3,3'-dimethyldicyclohexylmethane.

All the bifunctional or polyfunctional substances mentioned that are reactive with isocyanates can also be used in mixtures.

Ethylene glycol, 1,2- and 1,3-propanediol, the isomeric butanediols, neopentyl glycol, 1,6-hexanediol, 2-ethyl-1,3-hexanediol, perhydrobisphenol and 4,8-bis(hydroxymethyl) tricyclo[5.2.0(2.6)]-decane (TCD alcohol) are preferred. Ethylene glycol, 1,2-propanediol and 1,4-butanediol are particularly preferred.

Suitable as component C) are aliphatic and aromatic alcohols, such as methanol, ethanol, N-propanol, isopropanol, butanol, hexanol, fatty alcohols, phenols etc. as well as, in particular, hydroxyalkyl(meth)acrylates with 2 to 12 carbon atoms in the alkyl chain, preferably 2 to 4 carbon atoms in the hydroxyalkyl residue, such as hydroxyethyl(meth)acrylate, 2- and 3-hydroxypropyl(meth)acrylate and 2-, 3- and 4-hydroxybutyl(meth)acrylate, and also OH-functional vinyl ethers, such as e.g. hydroxybutyl vinyl ethers, and mixtures thereof.

It is also possible to use as component C) on average 0.3-1.5-times OH-functional (meth)acrylic acid esters or amides of n-hydric alcohols or amines or amino alcohols, with mixtures also possibly being used. These compounds or product mixtures include e.g. the esters of glycerol, trimethylolpropane and/or pentaerythritol. Defined monoalcohols can also be obtained from the reaction of epoxyfunctional (meth) acrylates with (meth)acrylic acid. For example, the reaction of glycidyl methacrylate with acrylic acid gives a mixed acrylic acid-methacrylic acid ester of glycerol, which can also be used advantageously.

Hydroxyethyl acrylate and the isomeric hydroxypropyl acrylates are preferred.

The reaction of hydroxyfunctional acrylates with isocyanates is known, e.g. from P. K. T. Oldring (ed.), Chemistry and Technology of UV & EB Formulations for Coatings, Inks & Paints, vol. 2, 1991, SITA Technology, London, D. 73-97.

The preparation can be carried out in that 1.) either the isocyanate-containing components A) are taken and reacted with B) and C) by passing an oxygen-containing gas, preferably air, through them at a temperature above the melting point or softening temperature of the product to be produced in the temperature range of 30 to 150° C., preferably 70 to 130° C., particularly preferably 80 to 120° C., until the NCO content has fallen, in the case of the ratio of NCO:OH used=1, to the desired value, preferably less than 0.3 wt. %, particularly preferably less than 0.1 wt. %. During this process, it may be 2.) useful to meter in B) and C) separately one after the other, separately at the same time or as a mixture. It is preferable to meter them in as a mixture.

It is also possible 3.) to take B) and C) and meter in A). A fourth procedure, taking B) first, then metering in C) and finally adding A), can also be advantageous. 5.) The order of A) and B) in 4.) can be reversed. Variant 1) is particularly preferred.

The reactive thinner is preferably added to the initial component at the beginning, but can also be metered in later. A reactive thinner that is (partially) reactive with isocyanates is preferably introduced into the reaction mixture together with B) and/or C). It is also possible to add the reactive thinner only later to the already partly reacted product of A), B) and C) or A) and B) or A) and C). Subsequent incorporation, optionally by extrusion, is also possible. The addition of the reactive thinner at the beginning of the synthesis is preferred.

The production of the urethane can also usefully take place in two steps. In a first step, a prepolymer is produced which still contains isocyanate, and in a second step, this is reacted with more alcohol. It is preferred here that, in the first step, the monools are reacted with the isocyanate. In this method, the reactive thinner can be added both at the beginning during the production of the prepolymer or else in the second step.

The addition reaction leading to the urethane (optionally urea) can be accelerated in a manner that is known per se using suitable catalysts, such as e.g. tin octoate, dibutyltin dilaurate or tertiary amines, such as dimethylbenzylamine. The urethane acrylate obtained as the reaction product is conventionally protected from premature and undesirable polymerisation by adding suitable inhibitors or antioxidants, such as e.g. phenols and/or hydroquinones and/or stable N-oxyl radicals and/or phenothiazine or other radical interceptors in quantities of 0.0005 to 0.3 wt. % in each case, based on the resin melt. The addition of these auxiliary substances can take place before, at the same time as and/or following the reaction leading to the polyurethane (urea).

In addition to a discontinuous method, it is also possible to conduct the reactions in a tubular reactor, static mixer or reaction extruder or reaction kneader. The shorter reaction times are advantageous in these cases, in which higher temperatures (80-220° C.) can also be used.

The invention also provides powder coatings containing
i) at least one powder coating binder according to the invention,
ii) optionally other unsaturated binders different from i) with groups reacting with ethylenically unsaturated compounds by polymerisation under the action of actinic radiation (radiation-curing groups),
iii) optionally auxiliary substances and additives conventional in paint chemistry, such as pigments, flow control agents, deaerating agents, tribologically active additives and/or thixotropic agents and
iv) at least one thermally or photochemically activated radical former.

The powder coatings according to the invention have glass transition temperatures of 35 to 80° C., preferably 35 to 70° C., particularly preferably 45 to 60° C. This depends to a particular extent on the nature of the structural components and additionally on the molecular weight and the quantity of reactive thinner. Since, with increasing molecular weight, more reactive thinner can also be used and thus resins with the same glass transition temperatures are obtainable, the quantity of reactive thinner and thus the content of radiation-curing functionalities can be varied in this way.

The powdered coating compositions based on the powder coating binders according to the invention can also be processed without any further additives as heat-curing, clear powder coatings (in which case the binder would be identical with the coating composition). As auxiliary substances and additives conventional in paint technology, for example pigments, such as e.g. titanium dioxide, flow control agents, such as e.g. polybutyl acrylate or silicones, deaerating agents, such as e.g. benzoin, tribologically active additives, such as e.g. aliphatic amines, thixotropic agents and/or other additives can be provided and incorporated homogeneously e.g. in extruders or kneaders at temperatures of 40 to 140° C., preferably 70 to 120° C. The above-mentioned auxiliary substances and additives can be added to the reaction mixture or resin melt immediately after the end of, during or at the very beginning of the production.

The solid formed is then ground in a manner that is known per se and freed from coarse-particle portions, preferably at least from those with a particle size greater than 0.1 mm, by sieving.

The powder coatings produced according to the invention can be applied on to the substrates to be coated by conventional powder application methods, such as e.g. electrostatic powder spraying, triboelectric application or fluidised bed coating. The coatings are then initially melted by the action of heat (e.g. by IR radiators) and a clear film is formed, in so far as no pigments or similar have been incorporated. The temperature required is greater than 50° C., preferably greater than 70° C., particularly preferably greater than 80° C. The curing of the coatings can take place either by heating to 130 to 220° C., preferably 150 to 190° C., and/or by the action of high-energy radiation, such as UV radiation or electron beam emission. Electron emission is produced by thermal emission, as is known to the person skilled in the art, and accelerated by means of a potential difference. The high-energy electrons then impact through a titanium foil and are directed on to the binders to be cured. The general principles of electron beam curing are described in detail in "Chemistry & Technology of UV & EB Formulations for Coatings, Inks & Paints", vol. 1, P K T Oldring (ed.), SITA Technology, London, England, pp. 101-157, 1991. No photoinitiator is needed in electron beam curing.

In the case of curing by UV radiation, photoinitiators are incorporated as homogeneously as possible into the coating compositions. The compounds conventionally used are suitable as photoinitiators, if they have no negative effect on the powder properties such as free-flowing properties and shelf life. Examples of these are 1-hydroxycyclohexyl phenyl ketone, benzil dimethyl ketal or—in the case of pigmented substances—2-methyl-1-(4-(methylthio)phenyl-2-morpholin-opropanone-1 or trimethylbenzoyldiphenylphosphine oxide.

The photoinitiators, which are used in quantities of between 0.1 and 10 wt. %, preferably 0.1 to 5 wt. %, based on the weight of the paint binder, can be used as an individual substance or, because of frequent advantageous synergistic effects, also in combination with one another.

In the case of thermal curing, this can also take place with the addition of thermally decomposing radical formers. As is known to the person skilled in the art, suitable compounds are e.g. peroxy compounds, such as diacyl peroxides, e.g. benzoyl peroxide, alkyl hydroperoxides, such as e.g. diisopropylbenzene monohydro-peroxide, alkyl per esters, such as e.g. tert.-butyl perbenzoate, dialkyl peroxides, such as e.g. di-tert.-butyl peroxide, peroxydicarbonates, such as e.g. dicetyl peroxydicarbonate, inorganic peroxides, such as e.g. ammonium peroxydisulfate, potassium peroxydisulfate or else azo compounds, such as 2,2'-azobis[N-(2-propenyl)-2-methylpropionamides], 1-[(cyano-1-methylethyl)azo]formamides, 2,2'-azobis(N-butyl-2-methylpropionamides), 2,2'-azobis(N-cyclohexyl-2-methylpropionamides), 2,2'-azobis{2-methyl-N-[2-(1-hydroxybutyl)]propionamides}, 2,2'-azobis{2-methyl-N-[2-(1-hydroxybutyl)]propionamides and 2,2'-azobis {2-methyl-N-[1,1-bis(hydroxymethyl)-2-hydroxyethyl]propionamides. Particularly suitable are initiators in solid form with a melting point of less than 130° C. and a half life in the minutes range with a decomposition temperature greater than 100° C. It is also advantageous to minimise the concentration of stabilisers for thermal curing using an initiator.

The powder coatings according to the invention are suitable for the coating of substrates of wood, metal, plastic, mineral substances and/or substrates thereof that have already been coated, or of substrates thereof consisting of any combinations of said materials. Applications in the industrial coating of MDF panels, pre-assembled superior goods which already contain temperature-sensitive components, such as e.g. electronic components, but also the coating of furniture, coils, articles from daily life, car bodies and their accessory parts, should be given particular mention here.

The powder coating binders according to the invention can also be used in combination with one another here, or together with other binders conventionally used in powder coating chemistry, such as e.g. with polyesters, polyacrylates, polyethers, polyamides and polycarbonates, which can also optionally contain unsaturated groups. Suitable unsaturated groups are acrylate, methacrylate, fumaric, maleic, vinyl and/or vinyl ether groups. The quantitative ratios are determined such that the double bond density of the resulting mixture does not amount to less than 1.0 mol double bonds per kilogram, since in that case, adequate curing is often no longer possible.

The powder coating binders can also be used in adhesives and sealing compositions. In these applications, in the case of curing by UV radiation, it is a prerequisite that at least one of the two substrates to be bonded or sealed together can transmit UV radiation, i.e. must generally be transparent. In the case of electron emission, adequate transmission of electrons must be ensured. Suitable substrates consist of wood, metal, plastic, mineral substances and/or substrates that have already been coated or a mixture of these substrates.

The powder coating binders according to the invention are also suitable as components or curing compositions in thermoforming, injection moulding and die-casting processes. In this case, an object to be coated is introduced into a mould, with a distance of no more than 1 cm, preferably less than 0.3 cm, remaining between the object surface and the mould. The powder coating binder according to the invention is now pressed into the mould, preferably using an extruder, and then cured thermally and/or by radiation.

EXAMPLES

In the following examples, all percentages refer to the weight.

The glass transition temperature $T_g$ was determined using a differential scanning calorimeter (model DSC 12E, Metler-Toledo GmbH, Giessen, DE) in a temperature range of −15° C. to +150° C. (heating rate 10 K/minute).

The NCO content was determined by titration in accordance with DIN 53 185.

Examples According to the Invention

Example 1a 482.22 g isophorone diisocyanate, 0.28 g 2,5-di-tert.-butylhydroquinone, 0.70 g 2,6-di-tert.-butyl-4-methylphenol, 0.35 g Desmorapid® Z (dibutyltin dilaurate) (Bayer AG, Leverkusen, DE) and 0.70 g p-methoxyphenol were initially charged into a jar with a flat ground flange and heated to 90° C. A mixture of 114.10 g hydroxyethyl acrylate and 101.64 g ethylene glycol was then metered in, with evolution of heat; the temperature was initially maintained at 90° C. and, as viscosity increased, was raised to 130° C. After stirring for 1 h, an NCO content of 0.43 wt. % was reached. The melt was transferred into a dish and left to cool. The glass temperature of the amorphous, glassy, brittle product was 73.7° C.

Example 1b 60 g of the product from Example 1a and 15 g of dipentaerythritol pentaacrylate (Sartomer® SR 399, Cray Valley, Paris La Defense Cedex, France) were initially charged into a reaction vessel with a glass top and internal thermometer and heated to 120° C. After stirring for 1 h the mixture was cooled, giving a product with a glass transition temperature of 51.3° C.

Example 2a 459.30 g isophorone diisocyanate, 0.28 g 2,5-di-tert.-butylhydroquinone, 0.70 g 2,6-di-tert.-butyl-4-methylphenol, 0.35 g Desmorapid® Z (dibutyltin dilaurate) (Bayer AG, Leverkusen, DE) and 0.70 g p-methoxyphenol were initially charged into a jar with a flat ground flange and heated to 90° C. A mixture of 153.96 g hydroxyethyl acrylate and 84.71 g ethylene glycol was then metered in, with evolution of heat; the temperature was initially maintained at 90° C. and, as viscosity increased, was raised to 120° C. After stirring for 1 h, an NCO content of 0.23 wt. % was reached. The melt was transferred into a dish and left to cool. The glass temperature of the amorphous, glassy, brittle product was 59.0° C.

Example 2b 67.5 g of the product from Example 2a and 7.5 g of dipentaerythritol pentaacrylate (Sartomer® SR 399, Cray Valley, Paris La Defense Cedex, France) were initially charged into a reaction vessel with a glass top and internal thermometer and heated to 120° C. After stirring for 1 h the mixture was cooled, giving a product with a glass transition temperature of 48.5° C.

Example 3

37.70 g isophorone diisocyanate, 0.03 g 2,5-di-tert.-butylhydroquinone, 0.076 g 2,6-di-tert.-butyl-4-methylphenol, 0.076 g p-methoxyphenol, 8.34 g 1,2-ethanediol, 5.95 g 2-hydroxyethyl acrylate and 22.79 g dipentaerythritol pentaacrylate (Sartomer® SR 399, Cray Valley, Paris La Defense Cedex, France) were initially charged into a reaction vessel. With stirring, the temperature was then maintained at 80° C. for 1 h and then 90° C. for 2 h. 0.04 g Desmorapid® Z (dibutyl tin dilaurate) were then added and stirring was continued for a further 30 minutes. Finally, the mixture was heated to 100° C. for 100 minutes with stirring, and stirring continued. An NCO content of <0.07 wt. % was obtained. The reaction mixture was left to cool. The glass temperature of the amorphous, glassy, brittle product was 49.5° C.

Example 4

33.36 g isophorone diisocyanate, 0.03 g 2,5-di-tert.-butylhydroquinone, 0.076 g 2,6-di-tert.-butyl-4-methylphenol, 0.076 g p-methoxyphenol, 8.44 g 1,2-ethanediol, 2.63 g 2-hydroxyethyl acrylate and 30.35 g dipentaerythritol pentaacrylate (Sartomer® SR 399, Cray Valley, Paris La Defense Cedex, France) were initially charged into a reaction vessel. With stirring, the temperature was then maintained at 80° C. for 1 h and then 90° C. for 2 h. 0.04 g Desmorapid® Z (dibutyl tin dilaurate) were then added and stirring was continued for a further 30 minutes. Finally, the mixture was heated to 100° C. for 100 minutes with stirring, and stirring continued. An NCO content of <0.02 wt. % was obtained. The reaction mixture was left to cool. The glass temperature of the amorphous, glassy, brittle product was 52.3° C.

Examples 5-20

The following examples were produced in the same way as Examples 3 and 4. The same quantities of stabilisers (2,5-di-tert.-butylhydroquinone, 2,6-di-tert.-butyl-4-methylphenol, p-methoxyphenol) and catalyst Desmorapid® Z (dibutyl tin dilaurate) were used.

Example 21

Polyacrylate and Reactive Thinner 27.0 g Jonacryl® 587 (polyacrylate polyol with an OH value of 92, equivalent weight 609 and $T_g$=50° C., S. C. Johnson Polymer BV., Netherlands) and 3 g trimethylolpropane trimethacrylate were initially charged into an aluminium beaker with a glass top and internal thermometer and heated to 120° C. After stirring for 1 h the mixture was cooled. A product was obtained with a glass transition temperature of 38.3° C.

Example 22a

2-Step Method 87.88 g pentaerythritol triacrylate, 24.31 g hydropropyl acrylate, 0.13 g 2,6-di-tert.-butyl-4-methylphenol, 0.06 g Desmorapid® Z (dibutyl tin dilaurate) (Bayer AG, Leverkusen, DE) and 0.13 g methyl p-toluenesulfonate were initially charged into a three-necked flask with a reflux condenser and dropping funnel and heated to 50° C. 137.5 g isophorone diisocyanate are then added dropwise within 20 minutes and the temperature was maintained at 55° C. during this period. Stirring was continued for a further 3.5 hours and a liquid prepolymer was obtained with an NCO content of 14.1 wt. %.

Example 22b

2-Step Method 107 g of the product from Example 22a, 0.05 g 2,5-di-tert.-butyl hydroquinone, 0.09 g 2,6-di-tert.-butyl-4-methylphenol, 0.12 g p-methoxyphenol and 11.2 g 1,2-ethanediol were initially charged into a reaction vessel consisting of a metal

TABLE 1

Binders according to the invention for powder coatings based on urethane acrylate with reactive thinner.

| Example | Diol | Monool | Diisocyanate | Reactive thinner | $T_g$/° C. |
|---|---|---|---|---|---|
| 5 | 10.78 g ED | 7.68 g HEA | 48.69 g IPDI | 7.63 g TMPTA | 64.7 |
| 6 | 10.18 g ED | 7.26 g HEA | 46.00 g IPDI | 11.34 g TMPTA | 56.6 |
| 7 | 9.58 g ED | 6.82 g HEA | 43.27 g IPDI | 15.12 g TMPTA | 49.0 |
| 8 | 8.97 g ED | 6.39 g HEA | 40.53 g IPDI | 18.88 g TMPTA | 41.4 |
| 9 | 9.57 g ED | 6.82 g HEA | 43.22 g IPDI | 15.17 g TMPTA | 51.8 |
| 10 | 10.17 g ED | 7.25 g HEA | 45.94 g IPDI | 15.24 g IDMA | 55.0 |
| 11 | 10.22 g ED | 3.19 g HEA | 40.39 g IPDI | 27.5 g TMPTA | 49.8 |
| 12 | 9.35 g ED | 2.91 g HEA | 43.77 g W | 18.75 g TMPTA | 49.1 |
| 13 | 10.24 g ED | 3.19 g HEA | 40.50 g IPDI | 20.85 g TPGDA | 53.6 |
| 14 | 10.17 g ED | 7.25 g HEA | 45.94 g IPDI | 11.43 g IBOMA | 57.0 |
| 15 | 10.64 g ED | 3.32 g HEA | 42.07 g IPDI | 18.75 g HDDA | 52.8 |
| 16 | 12.67 g ED | 3.95 g HEA | 39.26 g TDI | 18.75 g TMPTA | 44.0 |
| 17 | 7.74 g ED | 2.70 g HPA | 30.59 g IPDI | 33.75 g DPEPA | 50.7 |
| 18 | 10.07 g PD | 7.32 g HEA | 37.14 g IPDI | 20.25 g DPEPA | 42.7 |
| 19 | 11.04 g PD | 8.03 g HEA | 40.71 g IPDI | 15.00 g DPEPA | 54.6 |
| 20 | 9.33 g ED | 8.31 g HEA | 42.15 g IPDI | 15.00 g TCDDMA | 50.6 |

Diols: ED: 1,2-ethanediol; PD: 1,2-propanediol
Monool: HEA: hydroxyethyl acrylate; HPA: hydroxypropyl acrylate
Diisocyanate: IPDI: isophorone diisocyanate = 1-isocyanato-3-isocyanatomethyl-3,5,5-trimethylcyclohexane; W: diisocyanatodicyclohexylmethane (H12-MDI); TDI: 80:20 mixture of 2,4- and 2,6-diisocyanatotoluene
Reactive thinner: TMPTA: trimethylolpropane triacrylate; TMPTMA: trimethylolpropane trimethacrylate; IDMA: isodecyl methacrylate; IBOMA: isobornyl methacrylate; HDDA: hexanediol diacrylate; DPEPA: dipentaerythritol pentaacrylate; TCDDMA: tricyclodecanedimethylol dimethacrylate can (preferably of aluminium), glass cap with pressure compensation and an aperture for a precision glass stirrer, temperature-controlled by standing the can in a metal block. The mixture was then heated to 90° C. for 1 h, with stirring. 0.09 g Desmorapid® Z (dibutyl tin dilaurate) were then added and stirring continued for a further 2 hours at 120° C. An NCO content of 0.02 wt. % was obtained. The mixture was left to cool. The glass temperature of the amorphous, glassy, brittle product was 37.0° C.

Example 23

Exemplary Coating Operation with the Binder from Example 3

The product from Example 1b was cut with a cutting machine from the company Alpine, model 10/6 ROL. 97.0 wt. % of this educt, 1.0 wt. % of the flow control agent Worléeadd 101 (Worlée-Chemie GmbH, Lauenburg, DE) and 2.0 wt. % Darocur® 1173 photoinitiator (Ciba Spezialitätenchemie GmbH, Lampertheim, DE) were weighed into a premix vessel and premixed in a Prism Pilot 3 premixer (premix setting 60 sec/1500 rpm). Extrusion was then performed in an APV extruder (HP 19 PC) with the following settings: zone 1: required value RT/zone 2: required value RT/speed: 300 rpm/ measured temperature of the melt: 55° C./metering setting 3.0/average utilisation of extruder capacity: 55%. The chips obtained were cooled overnight in a refrigerator (Liebherr-Profi Line) at 4° C., and then ground using a Neumann & Esser mill, model: ICM 4: (classifier 15 m/s; rotor 60 m/s), sieved using a 90 μm sieve and immediately sprayed on to a steel Q panel using an ITW Gema spray gun (50-60 mV; pressure variable; metering variable). The powder coating was melted in a circulating air oven at 130° C. for 20 min and the hot steel plate was then irradiated with UV light using an IST S131 P-7FO instrument (CK normal; belt speed 10 m/min). The film was hard straight away and, after cooling to room temperature (RT) and storage for 60 min, it was evaluated. The film thickness was greater than 60 μm, the particle size×50%=30.3 μm. The solvent resistance is evaluated using a wad of cotton wool soaked in acetone, which was moved across the film with a pressure of approx. 1 kg in 100 double strokes. The film was solvent- and scratch-resistant.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Powder coating binders having a glass transition temperature of at least 35° C., comprising at least one organic polymer selected from the group consisting of polyurethanes, polyesters, polyacrylates, polyethers, polyamides, polycarbonates and mixtures of the above polymers, together with at least 2 per cent by weight of one or more radiation-curing reactive thinners.

2. The powder coating binders according to claim 1, wherein at least one of the organic polymers contained comprises groups capable of reacting with ethylenically unsaturated compounds by polymerisation under the action of actinic radiation (radiation-curing groups).

3. The powder coating binders according to claim 1, wherein the powder coating binder has a glass temperature of at least 42° C.

4. The powder coating binders according to claim 1, comprising 5-45 wt. % of one or more radiation-curing reactive thinners.

5. The powder coating binders according to claim 1, wherein the reactive thinners are selected from the group consisting of trimethylolpropane triacrylate, trimethylolpropane trimethacrylate, dipentaerythritol pentaacrylate, and mixtures thereof.

6. Powder coatings containing
   i) at least one powder coating binder according to claim 1,
   ii) optionally other unsaturated binders different from i) with groups capable of reacting with ethylenically unsaturated compounds by polymerisation under the action of actinic radiation (radiation-curing groups),
   iii) optionally auxiliary substances and additives conventional in paint chemistry selected from the group consisting of pigments, flow control agents, deaerating agents, tribologically active additives and/or thixotropic agents, and
   iv) at least one thermally or photochemically activated radical former.

7. Coatings obtained from powder coating binders according claim 1.

8. Substrates coated with coatings according to claim 7.

9. Coatings obtained from coatings according to claim 6.

10. Substrates coated with coatings according to claim 9.

11. The powder coating binders according to claim 2, wherein the powder coating binder has a glass temperature of at least 42° C.

12. The powder coating binders according to claim 2, comprising 5-45 wt. % of one or more radiation-curing reactive thinners.

13. The powder coating binders according to claim 3, comprising 5-45 wt. % of one or more radiation-curing reactive thinners.

14. The powder coating binders according to claim 2, wherein the reactive thinners are selected from the group consisting of trimethylolpropane triacrylate, trimethylolpropane trimethacrylate, dipentaerythritol pentaacrylate, and mixtures thereof.

15. The powder coating binders according to claim 3, wherein the reactive thinners are selected from the group consisting of trimethylolpropane triacrylate, trimethylolpropane trimethacrylate, dipentaerythritol pentaacrylate, and mixtures thereof.

* * * * *